US010749168B1

(12) United States Patent
Johnson et al.

(10) Patent No.: US 10,749,168 B1
(45) Date of Patent: Aug. 18, 2020

(54) ELECTROCHEMICAL CELL OR BATTERY

(71) Applicants: Michael E. Johnson, Chenoa, IL (US); John Guthrie, Seattle, WA (US)

(72) Inventors: Michael E. Johnson, Chenoa, IL (US); John Guthrie, Seattle, WA (US)

( * ) Notice: Subject to any disclaimer, the term of this patent is extended or adjusted under 35 U.S.C. 154(b) by 315 days.

(21) Appl. No.: 16/012,734

(22) Filed: Jun. 19, 2018

(51) Int. Cl.

| | |
|---|---|
| ***H01M 4/36*** | (2006.01) |
| ***H01M 4/38*** | (2006.01) |
| ***H01M 4/66*** | (2006.01) |
| ***H01M 8/18*** | (2006.01) |
| ***H01M 12/08*** | (2006.01) |

(52) U.S. Cl.
CPC ........... *H01M 4/364* (2013.01); *H01M 4/368* (2013.01); *H01M 4/38* (2013.01); *H01M 4/663* (2013.01); *H01M 8/188* (2013.01); *H01M 12/08* (2013.01)

(58) Field of Classification Search
None
See application file for complete search history.

(56) References Cited

U.S. PATENT DOCUMENTS

| | | | |
|---|---|---|---|
| 4,814,241 A | 3/1989 | Nagashima et al. | |
| 9,413,025 B2 | 8/2016 | Lipka et al. | |
| 9,559,375 B2 | 1/2017 | Savinell et al. | |
| 2014/0030572 A1* | 1/2014 | Esswein | H01M 8/188 429/107 |
| 2016/0020493 A1 | 1/2016 | Van Dijk et al. | |
| 2017/0338508 A1 | 11/2017 | Tucker et al. | |

FOREIGN PATENT DOCUMENTS

| | | |
|---|---|---|
| CN | 102198957 | 9/2011 |
| WO | WO 2016/203388 | 12/2016 |
| WO | WO 2017/035257 | 3/2017 |

OTHER PUBLICATIONS

Tannic Acid, Wikipedia, dated prior to the application filing date, https://en.wikipedia.org/wiki/Tannic_acid.

Fundamental Knowledge, CN-Battery (2016), http://www.cn-battery.net/knowledge/knowledge.htm.

(Continued)

*Primary Examiner* — Haroon S. Sheikh
(74) *Attorney, Agent, or Firm* — William F. Lang, IV; Lang Patent Law LLC

(57) ABSTRACT

An electrochemical cell or battery uses iron gall ink as an electrolyte. In some examples, mold, bacteria, or yeast are allowed to grow on the electrolyte. The ink is made by combining tannic or gallic acid from a material such as dehydrated tea with a metal or transition metal sulfate, such as iron sulfate, potassium sulfate, or manganese sulfate. Urea, a metal or transition metal salt, and glycerin can also be added to the electrolyte to assist in the ion-producing reaction. One example includes electrodes made from iron and graphite, and an electrolyte of iron-gall or iron-tannate ink. Another example uses a manganese based ink. Aluminum, potassium, or sodium tannate ink, urea, and graphite can be used to make a metal-air cell, in which the cell is open to the air. The ink can be used as a charge transport in a redox-flow electrochemical cell. Yet another example utilizes Bauxite residue, a waste product of aluminum manufacture. The Bauxite is used to form an ink and used in cells similar to those described above.

23 Claims, 9 Drawing Sheets

24 10 28 − + 12 26 16 14 18 20 22

(56) References Cited

OTHER PUBLICATIONS

Zinc-Air Battery, Wikipedia, dated prior to the application filing date, https://en.wikipedia.org/wiki/Zinc%E2%80%93air_battery.
Michael C. Tucker, Adam Phillips, and Adam Z. Weber, All-Iron Redox Flow Battery Tailored for Off-Grid Portable Applications, 8 ChemSusChem 3996-4004 (2015).
Aluminum-Air Battery, Wikipedia, dated prior to the application filing date, https://en.wikipedia.org/wiki/Aluminium%E2%80%93air_battery.
Hydrolysis, Wikipedia, dated prior to the application filing date, https://en.wikipedia.org/wiki/Hydrolysis.
Iron Gall Ink, Wikipedia, dated prior to the application filing date, https://en.wikipedia.org/wiki/Iron_gall_ink.
Elmer Eusman, Iron gall ink—Chamistry, The Iron Gall Ink Website (1998), https://irongallink.org/igi_indexedde.html.
Elmer Eusman, Iron gall ink—Ingredients, The Iron Gall Ink Website (1998), https://irongallink.org/igi_indexee73.html.
Elmer Eusman, Iron gall ink—Manufacture of ink, The Iron Gall Ink Website (1998), https://irongallink.org/igi_index048a.html.
Iron (II) Sulfate, Wikipedia, dated prior to the application filing date, https://en.wikipedia.org/wiki/Iron(II)_sulfate.
Metal Ions in Aqueous Solution, Wikipedia, dated prior to the application filing date, https://en.wikipedia.org/wiki/Metal_ions_in_aqueous_solution.
Oak Apple, Wikipedia, dated prior to the application filing date, https://en.wikipedia.org/wiki/Oak_apple.

* cited by examiner

ELECTROCHEMICAL CELL OR BATTERY

TECHNICAL FIELD

The present invention relates to electrochemical cells, more commonly known as batteries. More specifically, an electrochemical cell in which one component of the cell is iron gall ink or another gall ink is disclosed.

BACKGROUND INFORMATION

Electrochemical cells produce electricity through a chemical reaction. Primary cells are single use cells, and must be discarded once the chemical reaction therein has progressed to a point at which meaningful electricity cannot be produced. Thus, using primary cells requires a source of additional primary cells. Secondary cells can be recharged by connecting the anode and cathode to a source of electricity, and can therefore be used multiple times. However, re-using a secondary cell requires access to a source of electricity for recharging the cell. Individuals in "off-grid" locations may not have access to either additional primary cells or a source of electricity for recharging secondary cells. Additionally, purchasing electrochemical cells and/or recharging equipment may not be within the means of people in less wealthy locations. Alternatively, individuals may be temporarily located off-grid, and/or be located in locations with some limited access to electricity, and such individuals may have a need to store electricity for those times when they do not have access to a source of electricity. It is helpful for such individuals to be able to construct a useful battery from materials that can be easily acquired in their location.

Numerous examples of electrochemical cells have been proposed, with several examples being described below. The entire disclosure of each and every reference identified herein is expressly incorporated herein by reference.

An example of a presently proposed electrochemical cell is WO 2017/035257, which discloses in all iron redox flow battery tailored for off grid portable applications. The battery is made from a low-carbon steel negative electrode (anode), a paper separator, a porous carbon paper positive electrode (cathode), and an electrolyte solution containing 0.5 M $Fe_2(SO_4)_3$ active material and 1.2 M NaCl supporting electrolyte. The cell is intended to be recharged by replacing the active materials periodically, rather than charging with an external electrical supply. The active ingredient may alternatively be $FeCl_3$, and the concentration of either active material may range from 0.2 5 M to 2 M. The membrane can be either AMX, Duramic, or printer paper. $Na_2SO_4$ can be used instead of NaCl.

US 2017/038508 discloses a cerium-hydrogen redox flow cell. The positive electrode is single woven platinum, expanded platinized Nb, or expanded platinized Ti mesh. The negative electrode is also platinum, such as platinum on carbon. The electrolyte is an aqueous solution of cerium methanesulfonate and methanesolfonate acid, and this is fed from a storage tank to the positive electrode. Gaseous hydrogen is fed from a storage tank to the negative electrode.

U.S. Pat. No. 9,413,025 disclose a hybrid flow battery with a manganese based anolyte and catholyte. The electrolyte includes $(NH_4)_2SO_4$, $NH_4HSO_4$, and mixtures thereof. The electrolyte system may also include a second supporting electrolyte, which is $H_2SO_4$. One example includes about 1 M to about 2 M $(NH_4)_2SO_4$ in about 1 M $H_2SO_4$, and also includes about 1.18 M manganese salt and about 1.13 M dimmonium salt. The battery does not include an ion exchange membrane. One example of an electrolyte can be prepared in 5 M $H_2SO_4$ by adding 55 mL of concentrated sulfuric acid to 200 mL of deionized water, followed by adding 43.1001 g of $MnSO_4{*}H_2O$. The cell 100 includes a flow cell chamber 110. The chamber 110 is in contact with both a negative electrode 120, and a positive electrode 130. The negative electrode 120 and positive electrode 130 are connected to a power source or load 140. An electrolyte or anolyte/catholyte is pumped by a pump 150 from an electrolyte reservoir 160 through the first compartment 110. The catholyte passes through the porous negative electrode 120 and is collected in the reservoir 170. The anolyte passes through the porous positive electrode 130 and is collected in the reservoir 180.

U.S. Pat. No. 9,559,375 discloses an iron flow battery. The iron flow cell 100 includes two half cells 102, 104, separated by a separator 106. Half cells 102 and 104 include electrodes 108 and 110, respectively, in contact with an electrolyte. An anodic reaction occurs in half cell 104, and a cathodic reaction occurs in half cell 102, making the electrode 110 the negative electrode. The electrolyte in half cells 102, 104 flows through the system to storage tanks 112, 114, respectively, so that fresh/regenerated electrolyte flows from the storage tanks into the half cells. The electrodes 108, 110 can be connected to another device to either supply electrical energy, or to receive electrical energy in order to be recharged.

The catholyte can be any suitable salt including chloride, sulfate, nitrate salt, or a combination of two or more thereof. In one example, the catholyte is a solution of $FeCl_2$ and $FeCl_3$. Although the range of acceptable concentrations is listed as 0.01 M to about 5M, a concentration of each of about 1.0 M is preferred. The catholyte includes $Fe_3^+$ stabilizing liquid such as cyanide, sucrose, glycerol, Ethylene glycol, DMSO, SAT, acetate, oxalate, citrate, acetyl acetonate, fluoride, tartrate, malic acid, succinic acid, amino acids, or combinations thereof. The concentration of the stabilizing liquid can range from about 0.01 M to about 10 M, but is preferably about 1 M to about 5 M. The catholyte also includes a salt such as NaCl, KCl, NH4CL, LICL, and similar salts.

The anolyte is a solution of $FeCl_2$ having a similar concentration to the above-described catholyte. The anolyte includes a hydrogen evolution suppressing additive such as boric acid, heavy metals, and organic materials suitable as surfactants and corrosion inhibitors. The concentration of boric acid can be from about 0.1 M to about 5 M, with about 1 M being preferred. At higher temperatures, higher concentrations of boric acid it may be utilized. Possible heavy metals include Pb, Bi, Mn, W, Cd, As, Sb, Sn, or combinations thereof. The heavy metal additive can have a concentration from about 0.0001 M to about 0.1 M, with about 0.01 M to about 0.025 M being preferred.

The negative electrode is a steel coil having an iron plating. The negative electrode can also be a slurry electrode or fluidized bed electrode. Suitable particles for use with in the slurry include carbon-based particles such is graphitic, iron particles iron coated particles, or a combination thereof.

US 2016/0020493 discloses in iron-sulfide-based battery and anode. The battery includes an anode having iron sulfide as the active material. The sulfur content is at least 5% by weight of the total of all iron and sulfur. The battery further includes a cathode and an alkaline electrolyte. Preferably, the sulfur content of the anode is more than 10% by weight, and no more than 70% by weight. More preferred ranges of 20 to 40% weight sulfur, or 36 weight percent (50% atomic)

sulfur or also discussed. A binder is used to bind the iron sulfide particles together. Suitable binders include PTFF, PVDF, Polyaniline, Pyrrole, Polyethylene, and PMMA. Other binders include acrylic binders, acetyl triethyl citrate, diethyl phthalate, polyalkylene glycol. The binder is typically about 10 to 20% by weight as compared to the iron sulfide. Conductive particles such as carbon black, graphite, silver, gold, graphene, carbon nanotubes, and others can also be included within the anode.

The nature of the cathode is described as not critical to this battery. Any positive electrode with a suitable potential is claimed to be usable. Suitable electrodes include nickel hydroxide, air cathodes, manganese dioxide, cadmium, and others. Air cathodes can be a powder composite including carbon black, catalyst particles such is manganese oxide, and a hydrophobic polymeric binder.

The electrolyte is an alkaline component dissolved in water. The alkaline components is a hydroxide of an alkali metal such is lithium, potassium, sodium, or cesium hydroxide, or combinations thereof. Hey separator can be included between the cathode and anode. The separator should be poorest to allow for passage of the electrolyte, but to prevent the electrodes from short-circuiting. Examples include polycarbonate, polypropylene, polyolefin, or other separators WO 2016/203388 discloses a process for the production of a functionalized graphene. The process involves the exfoliation of a graphite electrode for producing graphene sheets functionalized with one or more of biomolecules. The biomolecules or any organic substance or organic molecule having functional groups capable of binding to graphene, such as carbohydrates, lipids, protons including enzymes, nucleic acids, primary and secondary metabolites, or natural substances. Enzymes such as alkaline phosphatase or peptides such as GSH are preferred. At least the electrode acting as the anode is made of graphite. The electrode acting as the cathode may be made of metal such as platinum or gold, or may be made from graphite. A phosphate buffered saline is used is the electrolyte solution.

U.S. Pat. No. 4,814,241 discloses electrolytes for redox flow batteries. The electrolyte contains from 1 to 4 normal hydrochloric acid and at least 0.5 mole/liter of an active material. The electrolyte further containers from 0.1 to 4 normalities of an acid comprising an anion which does not inhibit the electrode reactions in addition to the hydrochloric acid. The electrolyte reduces the cell resistivity and improves the solubility of active materials. In all examples, the negative electrolyte is 1.0 mole/liter chromic chloride, and the positive electrode is 1.0 mole/liter ferrous chloride and 1.0 mole/liter of ferric chloride. In one example, hydrobromic acid was used. Sulfuric acid can also be used. The iron/chromium system can be replaced by systems consisting of Mn/Cr, $Br_2$/Cr, and $Cl_2$/Cr.

CN 102198957 discloses a method for preparing vanadyl sulfate for vanadium ion redux flow battery. The method includes diluting concentrated sulfuric acid into dilute sulfuric acid. Then vanadic anhydride is directly added into the dilute sulfuric acid while staring to obtain a vanadium sulfate solution. A reducing agent is selected from one or more of the flavanol compounds, anthocyanin compounds, flavanoids, flavanol compounds, phenolic acid compounds, and vitamin substances.

Producing an electrochemical cell capable of efficiently and effectively producing electricity in meaningful, useful quantities from materials that are typically available in off-grid locations has proven to be difficult. Accordingly, there is a need for such a cell.

SUMMARY

The above needs are met by an electrochemical cell. The electrochemical cell comprises a housing, an anode disposed at least partially within the housing, a cathode disposed at least partially within the housing, and at least one electrolyte contained within the housing. The at least one electrolyte comprises gall ink. The anode and cathode are in contact with at least one electrolyte.

The above needs are further met by a method of making an electrochemical cell. The method comprises providing a housing, providing an anode at least partially disposed within the housing, providing a cathode at least partially disposed within the housing, and providing at least one electrolyte within the housing. The at least one electrolyte comprises gall ink.

The above needs are further met by a method of generating electricity from an electrochemical cell. The method comprises providing a housing, providing an anode at least partially disposed within the housing, providing a cathode at least partially disposed within the housing, and providing at least one electrolyte within the housing. The at least one electrolyte comprises gall ink having $metal^{3+}$ ions therein. The anode and cathode are connected to a load.

These and other aspects of the invention will become more apparent through the following description and drawings.

BRIEF DESCRIPTION OF THE DRAWINGS

Like reference characters denote like elements throughout the drawings.

DETAILED DESCRIPTION

Figure 1:
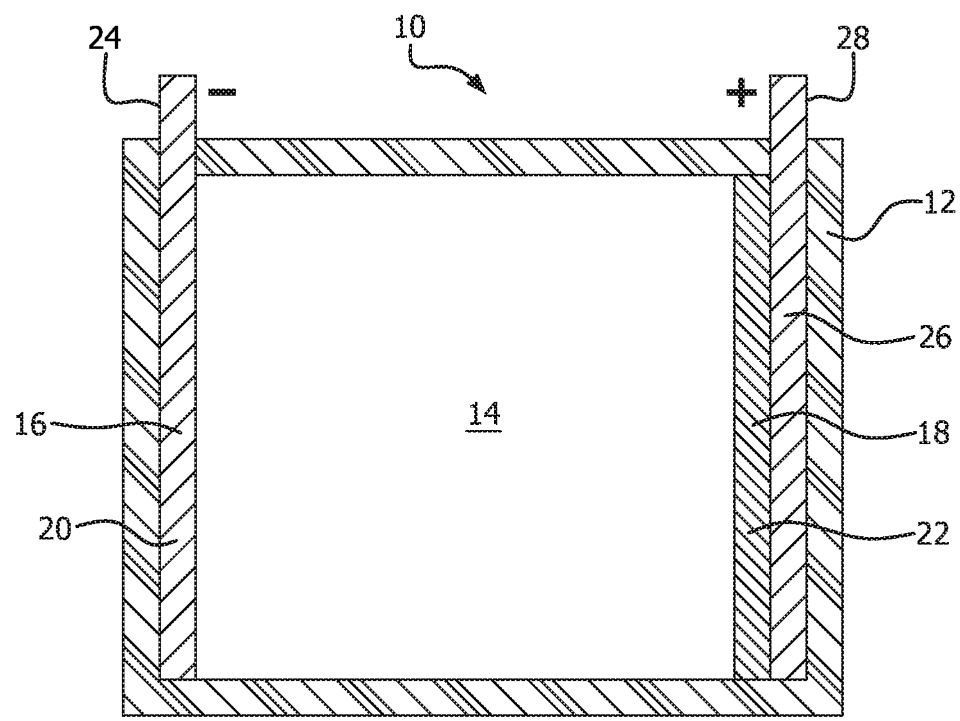
FIG. 1 is a diagrammatic view of an electrochemical cell, showing a basic cell without a separator between the anode and cathode portions.

Referring to the drawings, various examples of electrochemical cells or batteries are illustrated. In general, the term "battery" is commonly used regardless of whether a single electrochemical cell or a plurality of electrochemical cells is described. However, "battery" most correctly refers to a plurality of electrochemical cells connected together in series and/or in parallel. Since "battery" is commonly used to refer to single electrochemical cells, as used herein, "battery" may refer to a single electrochemical cell or to a plurality of electrochemical cells.

Referring to FIG. 1, an example of an electrochemical cell 10 is illustrated. The cell 10 includes a housing 12 containing an electrolyte 14 therein. An anode 16 and cathode 18 are secured within the housing so that an internal portion 20, 22 of the anode 16 and cathode 18, respectively, are in contact with the electrolyte 14. An external portion 24 of the anode 16 provides a means of connecting a load to the cell 10, or a power supply in the event that a rechargeable cell 10 is constructed. The illustrated example of the anode 16 is made from either iron or manganese, although other materials, for example, steel, aluminum, aluminum alloys, and combinations thereof could also be used. The illustrated example of the cathode 18 is made from $Fe_2O_3$, $MnO_2$, or bauxite (approximately 60% $Fe_2O_3$) residue, supported by a current collector 26. The current collector 26 includes an external portion 28 for connecting a load to the cell 10, or to a power supply in the event that a rechargeable cell 10 is constructed. The illustrated example of the current collector 26 is made from graphite, although other examples could be made from amorphous carbon, carbon felt, or other forms of carbon.

The electrolyte 30 of the battery 10 is gall ink. As defined herein, gall ink is any ink made by combining tannic acid and/or gallic acid with a metal and/or transition metal sulfate, such as iron sulfate, potassium sulfate, manganese sulfate, aluminum sulfate, zinc sulfate, and/or combinations thereof. While such inks are commonly known as iron gall ink due to the prominent use of iron sulfate ($FeSO_4$), the batteries herein are not limited to iron sulfate, and thus the broader term gall ink will be used. Additionally, while much of the description herein is based on the example of iron sulfate, the principles remain the same if other metal sulfates are used instead of iron sulfate.

Tannins include gallotannic acid (a glucose molecule with 5 gallic acid groups) and quercitannic acid. Tannins can be extracted from oak galls (also called oak apples), as well as from various leaves (for example, dehydrated tea leaves or oak leaves), bark (such as oak bark), pods, fruits, and gall nuts. Boiling crushed or ground galls (or leaves, pods, fruits, or nuts) in water, beer, or wine extracts the gallotannic acid. The addition of an acid such as vinegar or hydrochloric acid and/or boiling the gallotannic acid in an acidic environment increases the percentage of gallic acid. Alternatively, fermentation or hydrolysis of the gallotannic acid releases gallic acid ($C_6H_2(OH)_3COOH$). During fermentation, enzymes released by mold react with the glucose and hydrolize the gallic acid. Water is included in the mixture. If used as an ink, gum Arabic serves as a binder, but gum Arabic is not a requirement for use of gall ink as an electrolyte, anolyte, or catholyte. Other additives, such as sugar, sulfur, and/or urea can be added.

Iron Sulfate can be obtained from a variety of sources. It is often sold as a dietary iron supplement. Iron can be found in bauxite residue, which can be combined with sulfuric acid to produce iron sulfate. When iron sulfate is dissolved in water, the result is the aquo complex $[Fe(H_2O)_6]^{2+}$, as well as $[SO_4]^{2-}$.

In order to initiate a chemical reaction capable of producing electricity, the $Fe^{2+}$ ions (or other metal ions, which will be designated $metal^{2+}$) within the gall ink 14 must first be converted to $Fe^{3+}$ (or other metal ions, which will be designated $metal^{3+}$). This can be accomplished in a few different ways. If the gall ink 14 is un-oxidized, the cell 10 can be charged using a standard, presently available charger designed to charge presently available nickel metal hydride (NiMH) cells. The positive terminal of the charger is connected to the current collector 26 of the cathode 18, and the negative terminal of the charger is connected to the anode 16. Presently available chargers for NiMH cells typically monitor the voltage of the cell as it is being charged, and discontinue charging when the rate of change in the voltage corresponds to a rate of change that indicates a full charge.

If the gall ink 14 is allowed to oxidize, then the oxidation of the ink will result in a charged cell 10, making the use of a charger unnecessary. Exposure of the gall ink to oxygen from atmospheric air results in oxidation of the iron ions from $Fe^{2+}$ to $Fe^{3+}$. Oxidation of the gall ink 14 can be accomplished by simply exposing the gall ink 14 to air, and/or by bubbling air through the gall ink 14.

Some examples of the electrolyte 30 may include mold growing on the gall ink. Gall ink is susceptible to a variety of molds that naturally grow on the ink. The present inventor has found that permitting mold to grow on the ink improves the functioning of the cell 10. Specifically, cells producing 0.8 to 0.9 volt without mold on the ink are capable of producing an additional 0.1 to 0.2 volt when mold is allowed to grow on the ink. While the invention is not confined to any specific theory of operation, the mold is believed to solubilize the $Fe^{3+}$, as well as releasing enzymes that react with the glucose and hydrolize the gallic acid.

As the cell 10 is connected to a load and discharged, the chemical reaction at the cathode (assuming an ink made from iron sulfate) is $2Fe^{3+}+2e^{-}\rightarrow 2Fe^{2+}$. If sulfates of other metals or transition metals are used as the electrolyte or catholyte, then the reaction would be similar, substituting those metals for iron in the above equation. Expressed more broadly, the reaction at the cathode can be expressed as $2metal^{3+}+2e^{-}\rightarrow 2metal^{2+}$ The chemical reaction at the anode (assuming an iron anode) is $Fe^{0}\rightarrow Fe^{2+}+2e^{-}$. If other metals are used as the anode, then the reaction would be similar, substituting those metals for iron in the above equation. Expressed more broadly, the chemical reaction at the anode is $metal^{0}\rightarrow metal^{2+}+2e^{-}$. Thus, the total electricity-producing reaction is $2Fe^{3+}+Fe^{0}\rightarrow 3Fe^{2+}$, or expressed more broadly, $2metal^{3+}+metal^{0}\rightarrow 3metal^{2+}$. The reactions during charging of the cell 10 are the reverse of the above reactions.

Once a cell 10 or any other cell herein is assembled, the water may be permitted to evaporate. When the water is present, the iron (or other metal or transition metal) is present as part of an aquo complex such as $[Fe(H_2O)_6]^{2+}$. Permitting the water to evaporate removes the metal or transition metal from the aquo complex, the cell can be permitted to sit for long periods of time without discharge. When use of the cell is desired, simply adding water will restore the metal or transition metal aquo complex, thus facilitating the chemical reactions which produce electricity.

Figure 2:
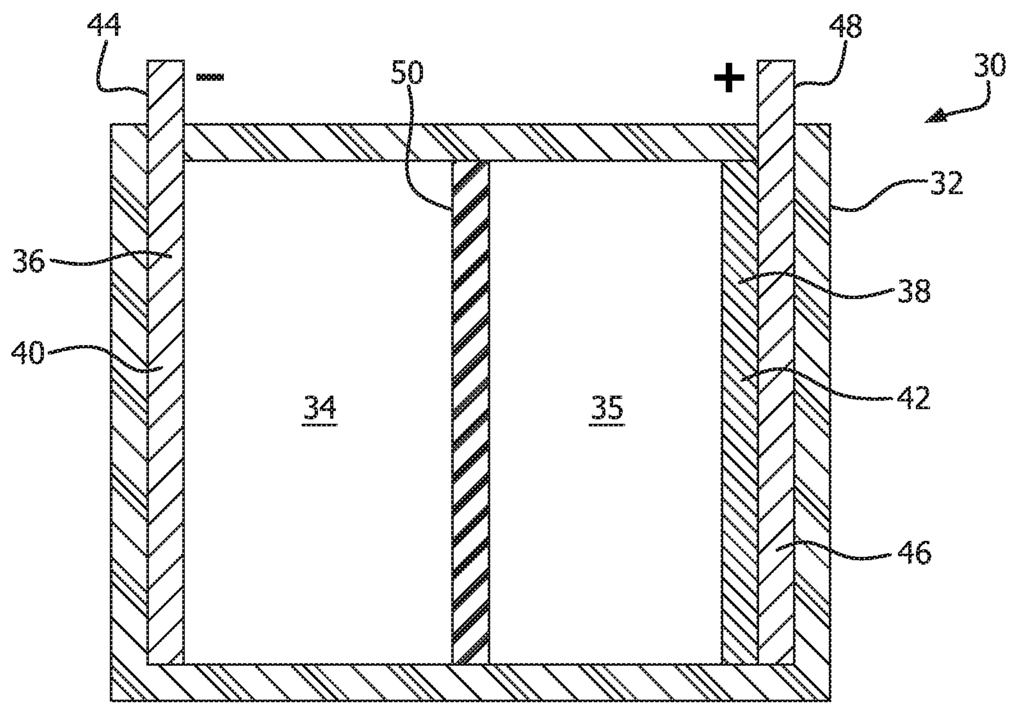
FIG. 2 is a diagrammatic view of another electrochemical cell, showing a basic cell with a separator between the anode and cathode portions.

Although the principles of operation have been described primarily in connection with the cell 10 of FIG. 1, essentially the same principles of operation can be applied to a variety of other types of cells. Another example of an electrochemical cell 30 is illustrated in FIG. 2. The cell 30 includes a housing 32 containing an electrolyte 34, 35 therein. An anode 36 and cathode 38 are secured within the housing so that an internal portion 40, 42 of the anode 36 and cathode 38, respectively, are in contact with the electrolyte 34 (the anolyte) and 35 (the catholyte), respectively. An external portion 44 of the anode 36 provides a means of connecting a load to the cell 30, or a power supply in the event that a rechargeable cell 30 is constructed. The illustrated example of the anode 36 is made from either iron or manganese, although other materials, for example, steel, aluminum, and aluminum alloys could also be used. The illustrated example of the cathode 38 is made from $Fe_2O_3$, $MnO_2$, or bauxite (approximately 60% $Fe_2O_3$) residue, supported by a current collector 46. The current collector 46 includes an external portion 48 for connecting a load to the cell 30, or to a power supply in the event that a rechargeable cell 30 is constructed. The illustrated example of the current collector 48 is made from graphite, although other examples could be made from amorphous carbon, carbon felt, or other forms of carbon.

The cell 30 differs from the cell 10 by including a separator 50, separating the anolyte 34 from the catholyte 35. The separator 50 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of electrolyte 34, 35 therethrough. Yet another possible separator for this and other cells described herein is symbiotic culture of bacteria and yeast.

Figure 3:
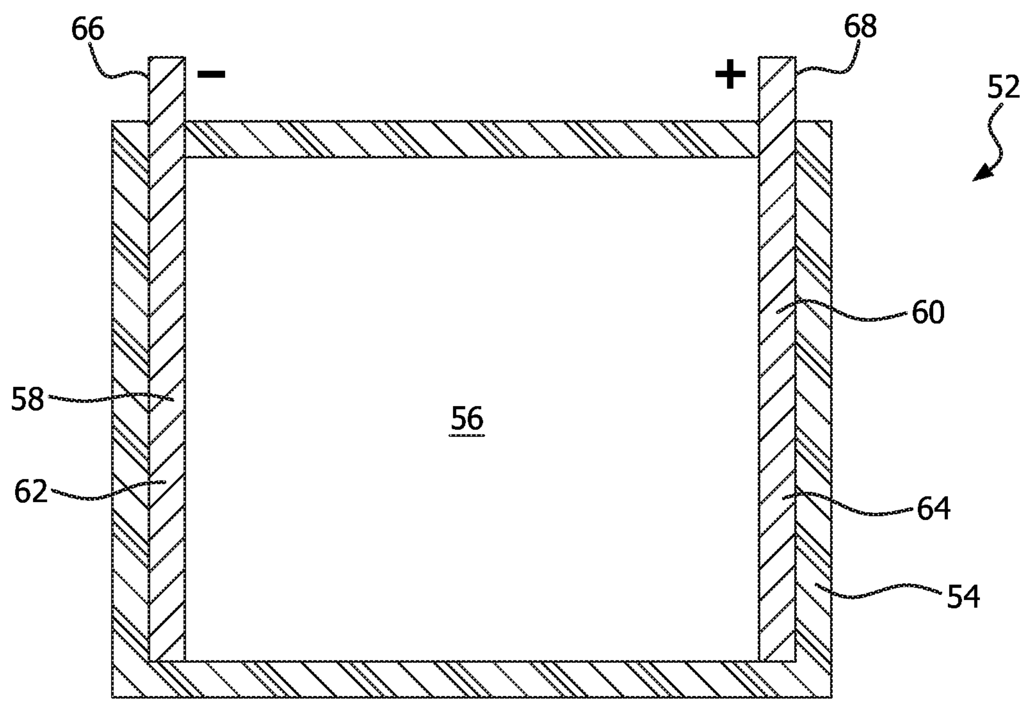
FIG. 3 is a diagrammatic view of yet another electrochemical cell, showing a different type of cathode and without a separator.

Yet another example of an electrochemical cell 52 is illustrated in FIG. 3. The cell 52 includes a housing 54 containing an electrolyte 56 therein. An anode 58 and cathode 60 are secured within the housing so that an internal portion 62, 64 of the anode 58 and cathode 60, respectively, are in contact with the electrolyte 56. An external portion 66 of the anode 58 provides a means of connecting a load to the cell 52, or a power supply in the event that a rechargeable cell 52 is constructed. The illustrated example of the anode 58 is made from either iron or manganese, although other materials, for example, steel, aluminum, and aluminum alloys could also be used. The illustrated example of the cathode 60 is made from graphite or another form of carbon. The cathode 60 includes an external portion 68 for connecting a load to the cell 52, or to a power supply in the event that a rechargeable cell 52 is constructed.

Figure 4:
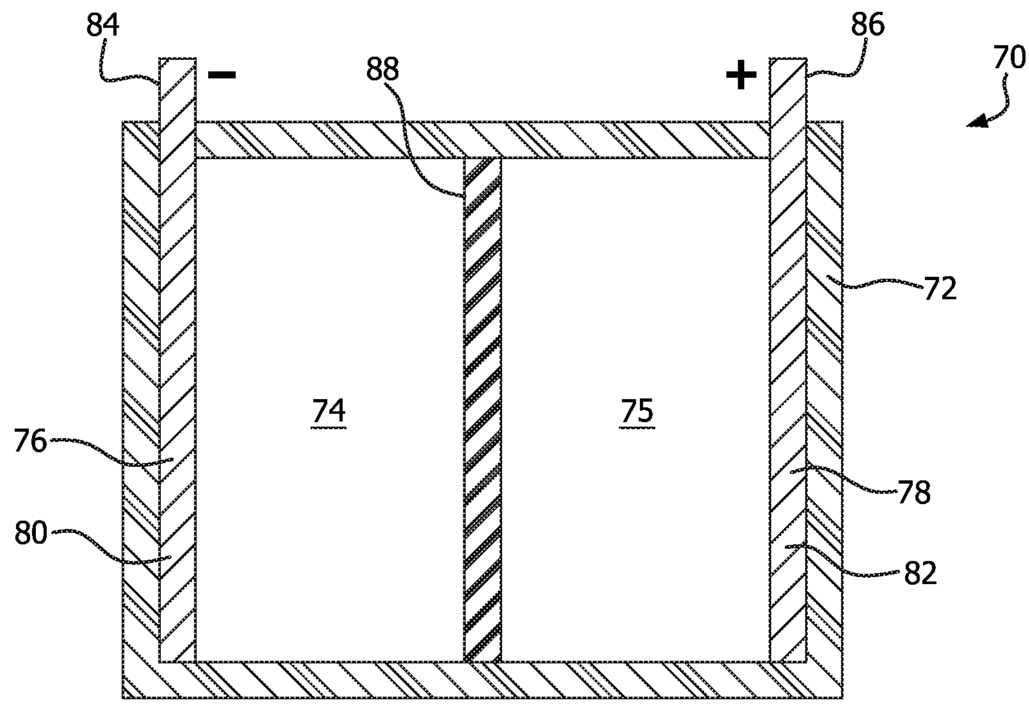
FIG. 4 is a diagrammatic view of another electrochemical cell, with the cathode of FIG. 3 and without a separator.

A modified example of the electrochemical cell 52 is illustrated in FIG. 4 as cell 70. The cell 70 includes a housing 72 containing an electrolyte 74, 75 therein. An anode 76 and cathode 78 are secured within the housing so that an internal portion 80, 82 of the anode 76 and cathode 78, respectively, are in contact with the electrolyte 74 (the anolyte) and 75 (the catholyte), respectively. An external portion 84 of the anode 76 provides a means of connecting a load to the cell 70, or a power supply in the event that a rechargeable cell 70 is constructed. The illustrated example of the anode 76 is made from either iron or manganese, although other materials, for example, steel, aluminum, and aluminum alloys could also be used. The illustrated example of the cathode 78 is made from graphite or another form of carbon. The cathode 78 includes an external portion 86 for connecting a load to the cell 70, or to a power supply in the event that a rechargeable cell 70 is constructed. The cell 70 differs from the cell 52 by including a separator 88, separating the anolyte 74 from the catholyte 75. The separator 78 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of electrolyte 74, 75 therethrough.

Figure 5:
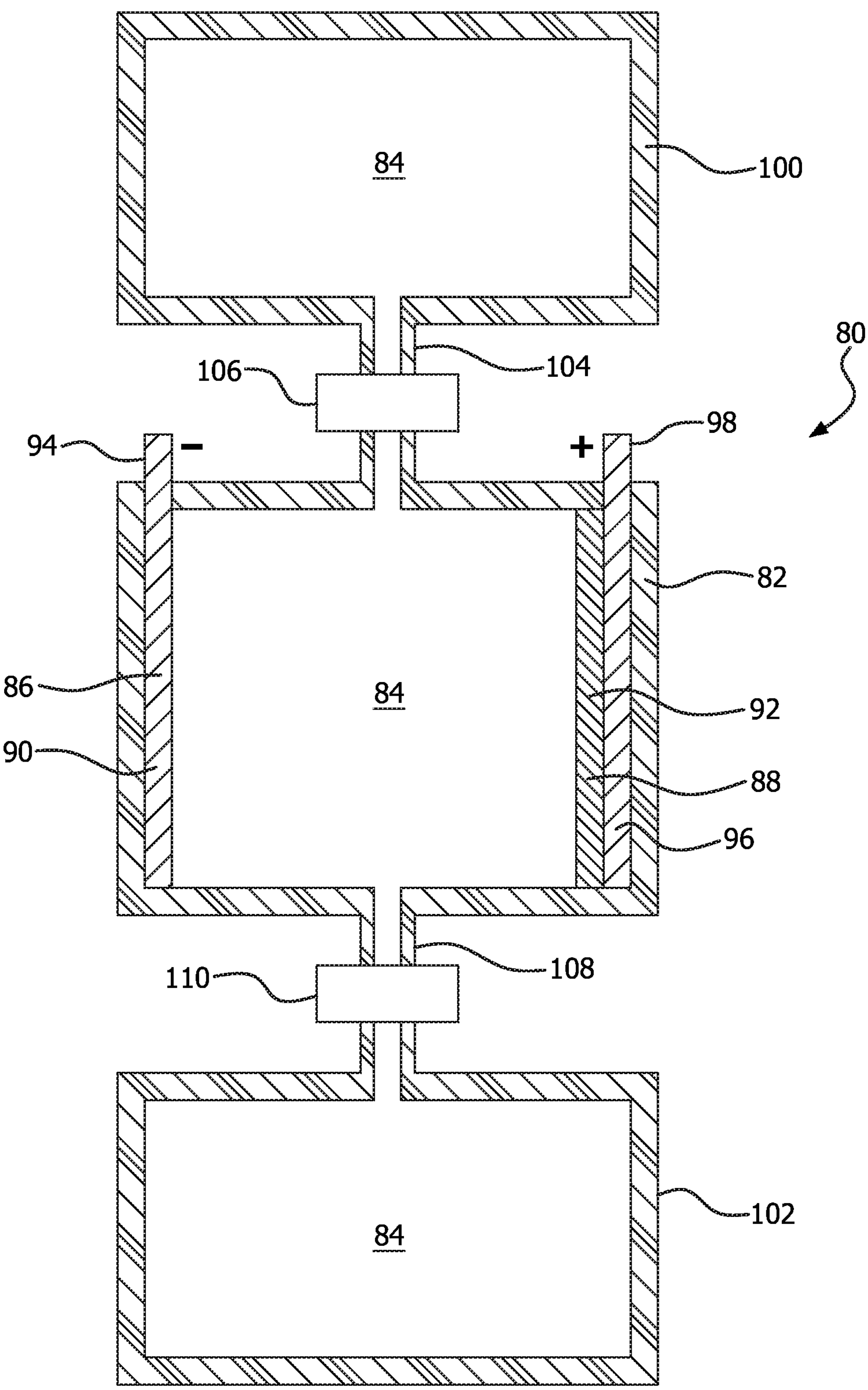
FIG. 5 is a diagrammatic view of another redox-flow electrochemical cell, without a separator.

An example of a redox flow electrochemical cell 80 is illustrated in FIG. 5. The redox flow cell 80 is similar to the cell 10. The cell 80 includes a housing 82 containing an electrolyte 84 therein. An anode 86 and cathode 88 are secured within the housing so that an internal portion 90, 92 of the anode 86 and cathode 88, respectively, are in contact with the electrolyte 84. An external portion 94 of the anode 86 provides a means of connecting a load to the cell 80, or a power supply in the event that a rechargeable cell 80 is constructed. The illustrated example of the anode 86 is made from either iron or manganese, although other materials, for example, steel, aluminum, and aluminum alloys could also be used. The illustrated example of the cathode 88 is made from $Fe_2O_3$, $MnO_2$, or bauxite (approximately 60% $Fe_2O_3$) residue, supported by a current collector 96. The current collector 96 includes an external portion 98 for connecting a load to the cell 80, or to a power supply in the event that a rechargeable cell 80 is constructed. The illustrated example of the current collector 96 is made from graphite, although other examples could be made from amorphous carbon, carbon felt, or other forms of carbon.

The cell 80 includes a first storage tank 100 and second storage tank 102, each of which contains electrolyte 84. In the illustrated example, the first storage tank 102 is utilized for storage of electrolyte 84 prior to the use of the electrolyte 84 to produce electricity. Thus, the electrolyte 84 within the first storage tank 100 includes $Fe^{3+}$ ions. As the cell 80 is used to power a load, electrolyte 84 flows through a conduit 104 that is connected between the first storage tank 100 and the housing 82. The conduit 104 may include an optional pump 106, or may utilize a gravity feed, with the flow rate being controlled by the size of the conduit 104 or by a valve. In the illustrated example, the first storage tank 100 is illustrated above the housing 82, so that a gravity feed may be utilized to move electrolyte from the first storage tank 100 into the housing 82 as the cell 80 is being used to power a load (since power for the pump 106 may not be available at a time when use of the cell 80 is desired). As the electrolyte 84 undergoes chemical reactions with the anode 86 and cathode 88, it is drained through a conduit 108 that is connected between the housing 82 and the second storage tank 102. An optional pump 110 is provided for the conduit 108. In the illustrated example, the second storage tank 102 is illustrated below the housing 82 so that spent electrolyte 84 may flow through the conduit 108 by gravity feed as the cell 80 is being used to power a load. The flow rate can be controlled by controlling the size of the conduit 108, or using a valve to partially restrict the flow. If recharging of the cell 80 is utilized, the pumps 106, 110 may be activated to cause electrolyte 84 to flow from the second storage tank 102 into the housing 82 to undergo the charging chemical reaction with the anode 86 and cathode 88. Electrolyte that has undergone the charging reaction may then flow through the conduit 104 into the first storage tank 100. Since an electrical power source is obviously available during recharging, the pumps 106, 110 would also have a power supply at this time.

Figure 6:
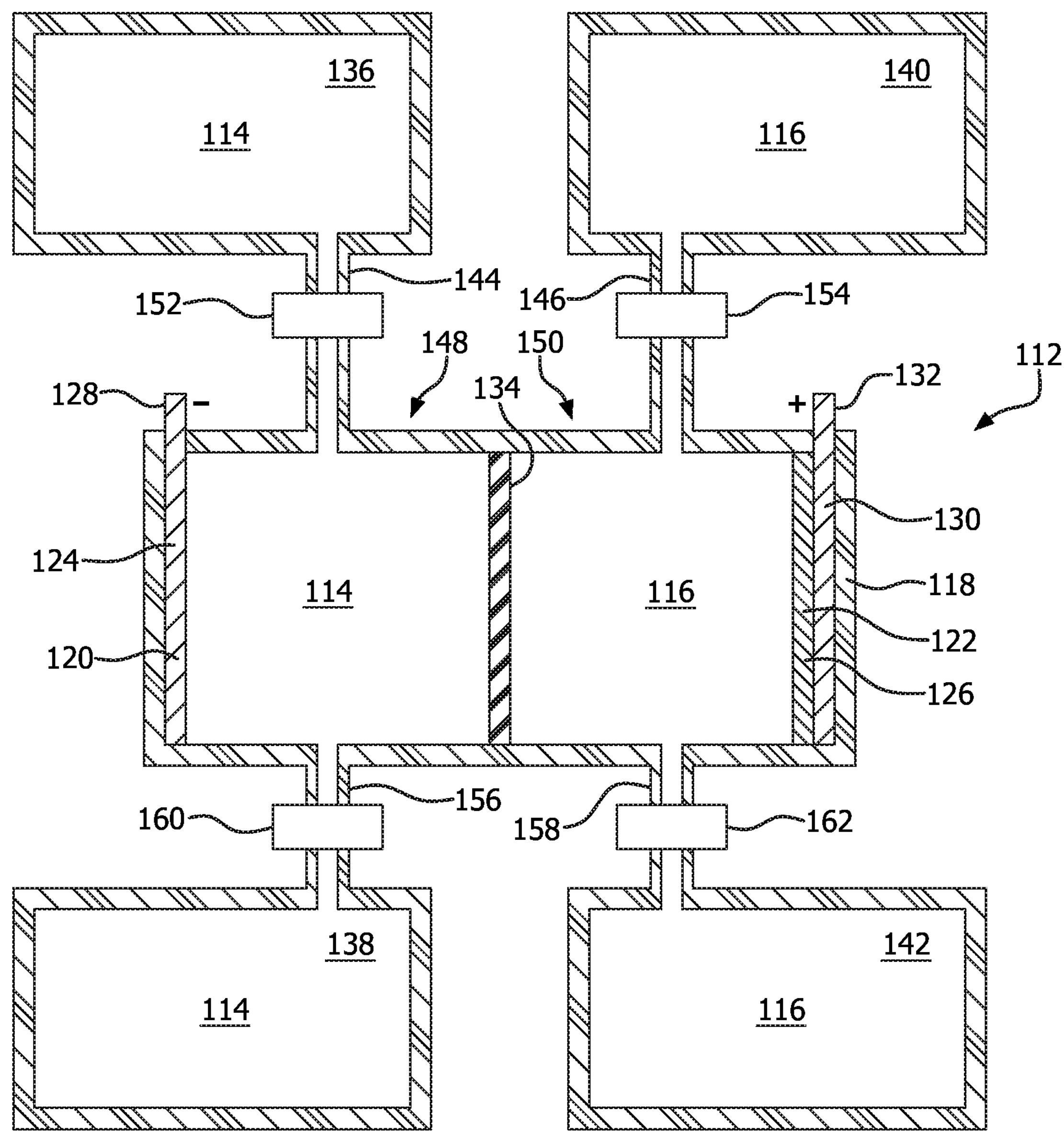
FIG. 6 is a diagrammatic view of another redox-flow electrochemical cell, with a separator.

FIG. 6 illustrates another example of a redox flow cell 112. The cell 112 is similar to the cell 80, but uses a separate anolyte 114 and catholyte 116. The cell 112 includes a housing 118. An anode 120 and cathode 122 are secured within the housing so that an internal portion 124, 126 of the anode 120 and cathode 122, respectively, are in contact with the anolyte 114 and catholyte 116, respectively. An external portion 128 of the anode 124 provides a means of connecting a load to the cell 112, or a power supply in the event that a rechargeable cell 112 is constructed. The illustrated example of the anode 120 is made from either iron or manganese, although other materials, for example, steel, aluminum, and aluminum alloys could also be used. The illustrated example of the cathode 122 is made from $Fe_2O_3$, $MnO_2$, or bauxite (approximately 60% $Fe_2O_3$) residue, supported by a current collector 130. The current collector 130 includes an external portion 132 for connecting a load to the cell 112, or to a power supply in the event that a rechargeable cell 112 is constructed. The illustrated example of the current collector 130 is made from graphite, although other examples could be made from amorphous carbon, carbon felt, or other forms of carbon.

The cell 112 includes a separator 134, separating the anolyte 114 from the catholyte 116. The separator 134 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of anolyte 114 and catholyte 116 therethrough.

The cell 112 includes a first anolyte storage tank 136 and second anolyte storage tank 138, each of which contains anolyte 114. Similarly, the cell 112 includes a first catholyte storage tank 140 and second catholyte storage tank 142, each of which contains catholyte 116. In the illustrated example, the first anolyte storage tank 136 and first catholyte storage tank 140 is utilized for storage of anolyte 114 and catholyte 116 prior to the use of the anolyte 114 and catholyte 116 to produce electricity. Thus, the catholyte 116 within the first catholyte storage tank 140 includes $Fe^{3+}$ ions. As the cell 112 is used to power a load, anolyte 114 and catholyte 116 flow through conduits 144, 146, respectively. The conduit 144 is connected between the first anolyte storage tank 136 and anole portion 148 of the housing 118. Similarly, the conduit 146 is connected between the first catholyte storage tank 140 and the cathode portion 150 of the housing 118. Each of the conduits 144, 146 may include an optional pump 152, 154, respectively, or may utilize a gravity feed, with the flow rate controlled either by the size of the conduit or by a valve. In the illustrated example, the first anolyte storage tank 136 and first catholyte storage tank 140 are illustrated above the housing 118, so that a gravity feed may be utilized to move anolyte 114 and catholyte 116 into the housing 118 as the cell 112 is being used to power a load (since power for the pump 152, 154 may not be available at a time when use of the cell 80 is desired).

As the anolyte 114 and catholyte 116 undergo chemical reactions with the anode 120 and cathode 122, they are drained through conduits 156, 158 into the second anolyte storage tank 138 and second catholyte storage tank 142, respectively. Anolyte 114 containing $Fe^0$ in addition to its initial ingredients will therefore pass into the second anolyte storage tank 138, while catholyte 116 containing $Fe^{2+}$ ions will pass into the second catholyte storage tank 142, thus making room for fresh anolyte 114 and catholyte 116. Optional pumps 160, 162 are provided for the conduits 156, 158, respectively. In the illustrated example, the second anolyte storage tank 138 and second catholyte storage tank 142 are illustrated below the housing 118 so that spent anolyte 114 and catholyte 116 may flow through the conduits 156, 158 by gravity feed as the cell 112 is being used to power a load. The flow rate can be controlled by the size of the conduits 156, 158 or by a valve. If recharging of the cell 112 is utilized, the pumps 152, 154, 160, 162 may be activated to cause anolyte 114 and catholyte 116 to flow from the second storage tanks 138, 142 into the housing 118 to undergo the charging chemical reaction with the anode 120 and cathode 122. Anolyte 114 and catholyte 116 that has undergone the charging reaction may then flow through the conduits 144, 146 into the first anolyte storage tank 136 and second catholyte storage tank 140. Since an electrical power source is obviously available during recharging, the pumps 152, 154, 160, 162 would also have a power supply at this time. As another alternative, the connections between storage tanks could simply be reversed to provide gravity feed during recharging.

Figure 7:
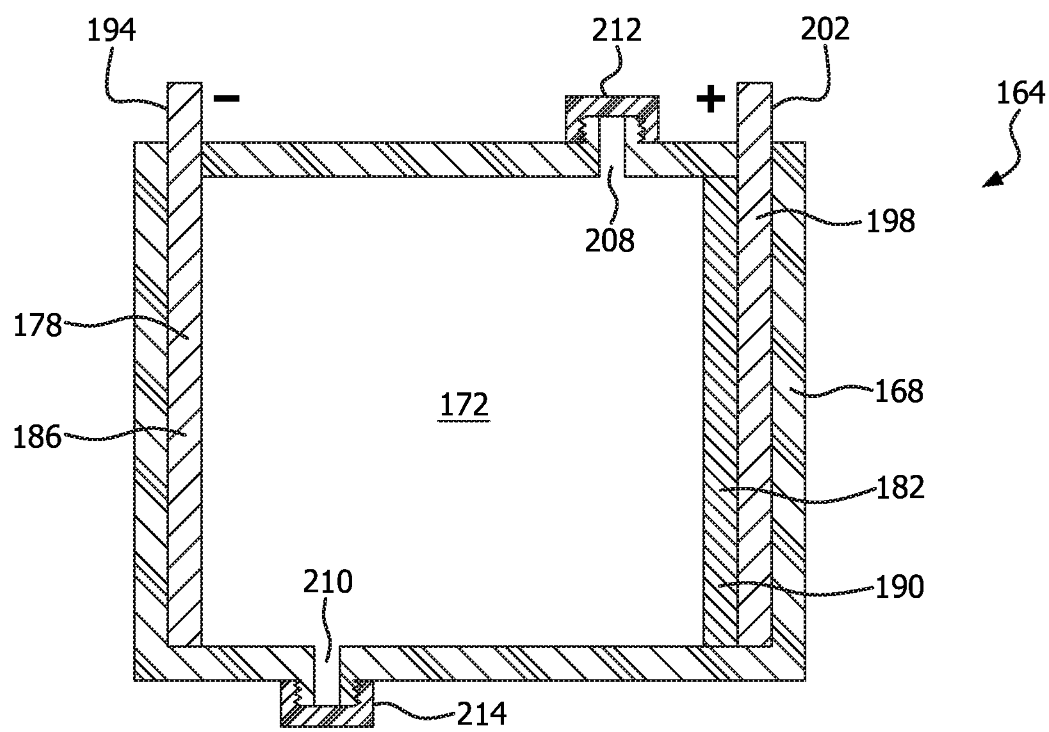
FIG. 7 is a diagrammatic view of yet another electrochemical cell designed to facilitate replenishing the electrolyte.
Figure 8:
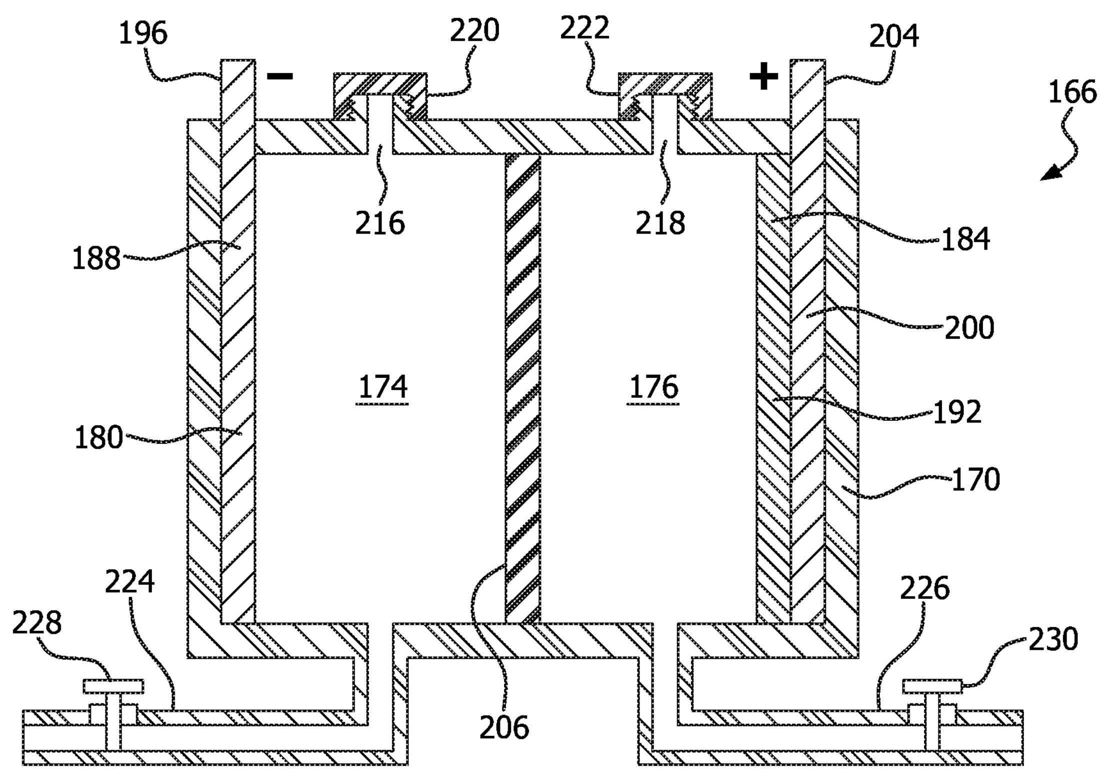
FIG. 8 is a diagrammatic view of another electrochemical cell designed to facilitate replacing the anolyte and catholyte.

FIGS. 7 and 8 illustrate cells which are essentially identical to those of FIGS. 1 and 2, respectively. The cells 164, 166 include housings 168, 170 containing an electrolyte 172, 174, 176 therein (with the electrolyte 174 being an anolyte and electrolyte 176 being a catholyte). An anode 178, 180 and cathode 182, 184 are secured within the housing so that an internal portion 186, 188, 190, 192 of the anode 178, 180 and cathode 182, 184, respectively, are in contact with the electrolyte 172, 174, or 176. An external portion 194, 196 of the anode 178, 180 provides a means of connecting a load to the cell 164, 166, or a power supply in the event that a rechargeable cell 164, 166 is constructed. The illustrated example of the anode 178, 180 is made from either iron or manganese, although other materials, for example, steel, aluminum, and aluminum alloys could also be used. The illustrated example of the cathode 182, 184 is made from $Fe_2O_3$, $MnO_2$, or bauxite (approximately 60% $Fe_2O_3$) residue, supported by a current collector 198, 200. The current collector 198, 200 includes an external portion 202, 204 for connecting a load to the cell 164, 166, or to a power supply in the event that a rechargeable cell 164, 166 is constructed. The illustrated example of the current collector 198, 200 is made from graphite, although other examples could be made from amorphous carbon, carbon felt, or other forms of carbon.

The cell 166 differs from the cell 164 by including a separator 206, separating the anolyte 174 from the catholyte 176. The separator 206 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of electrolyte 174, 176 therethrough.

The cells 164, 166 each include a means of easily draining and replenishing the electrolyte 172, anolyte 174, and catholyte 176. In the illustrated example of the cell 164, a pair of externally threaded openings 208, 210 are each closed with removable, internally threaded caps 212, 214. In the example of the cell 166, a pair of externally threaded openings 216, 218 are provided for adding anolyte 174 and catholyte 176, respectively. Each of the openings 216, 218 is closed with an internally threaded cap 220, 222. A drain pipe 224, 226 is provided for draining spent anolyte 174, 176, respectively. Each drain pipe 224, 226 can be opened and closed by manipulating a valve 228, 230 secured thereon. Obviously either method of opening and closing a cell to addition or removal of electrolyte, anolyte, or catholyte could be substituted for the other.

Figure 9:
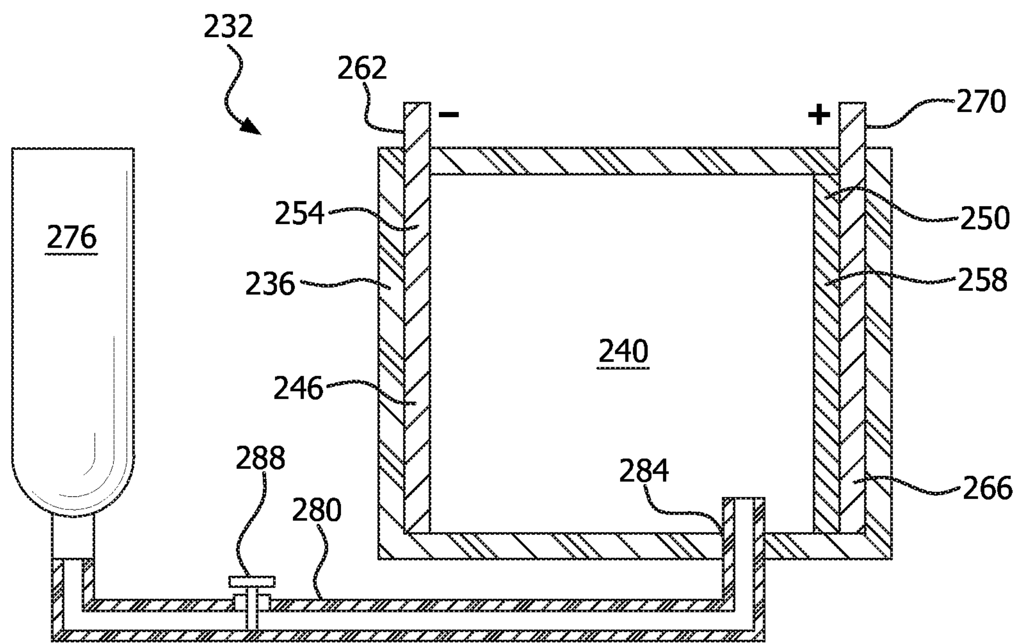
FIG. 9 is a diagrammatic view of a metal-air electrochemical cell utilizing air bubble generation and without a separator.
Figure 10:
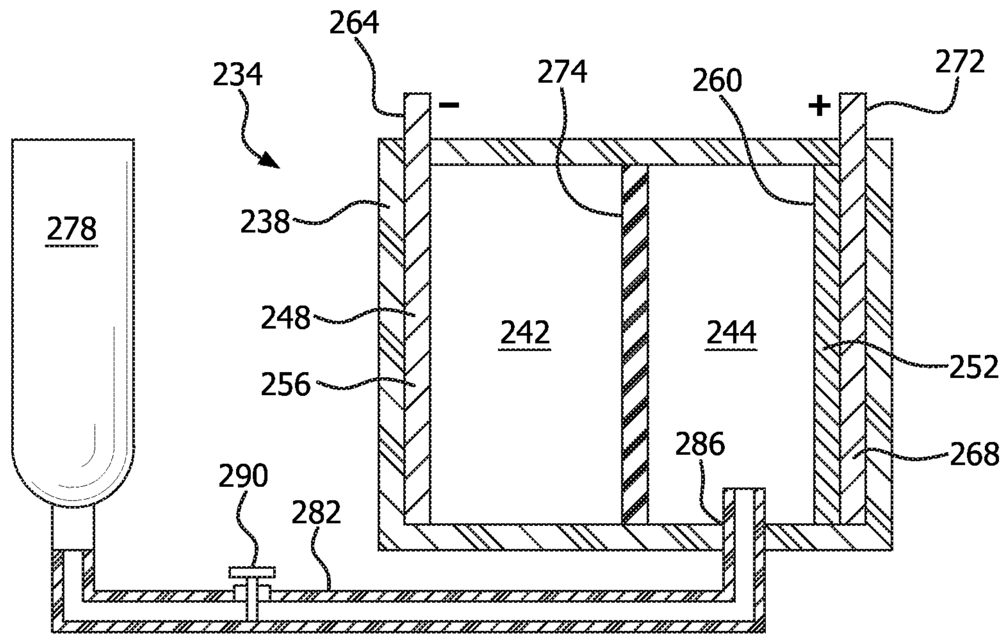
FIG. 10 is a diagrammatic view of another metal-air electrochemical cell utilizing air bubble generation and with a separator.

Referring to FIGS. 9 and 10, two variations of metal air cells 232, 234 are illustrated. The cells 232,234 include housings 236, 238 containing an electrolyte 240, 242, 244 therein (with the electrolyte 242 being an anolyte and electrolyte 244 being a catholyte). An anode 246, 248 and cathode 250, 252 are secured within the housing 236, 238 so that an internal portion 254, 256, 258, 260 of the anode 246, 248 and cathode 250, 252, respectively, are in contact with the electrolyte 240, 242, or 244. An external portion 262, 264 of the anode 246, 248 provides a means of connecting a load to the cell 232, 234, or a power supply in the event that a rechargeable cell 232, 234 is constructed. The illustrated example of the anode 246, 248 is made from either iron or manganese, although other materials, for example, steel, aluminum, and aluminum alloys could also be used. The illustrated example of the cathode 250, 252 is made from $Fe_2O_3$, $MnO_2$, or bauxite (approximately 60% $Fe_2O_3$) residue, supported by a current collector 266, 268. The current collector 266, 268 includes an external portion 270, 272 for connecting a load to the cell 232, 234, or to a power supply in the event that a rechargeable cell 232, 234 is constructed. The illustrated example of the current collector 266, 268 is made from graphite, although other examples could be made from amorphous carbon, carbon felt, or other forms of carbon.

The cell 232 differs from the cell 234 by including a separator 274, separating the anolyte 242 from the catholyte 244. The separator 274 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of electrolyte 242,244 therethrough.

The cells 232, 234 also include a means of bubbling or otherwise adding air to or through the electrolyte 240 or catholyte 244. In the illustrated examples, air sources 276, 278 are connected by conduits 280, 282 to openings 284, 286 defined in a lower portion 288, 290 of the housings 236, 238. Valves 292, 294 are provided as part of the conduits 280, 282 so that the flow of air can be turned on or off, or regulated as desired. Supplying air to the electrolyte 240 and catholyte 244 results in oxidation of the iron ions from $Fe^{2+}$ to $Fe^{3+}$. The valves 292, 294 can be opened when electricity is desired from the cells 232, 234, and closed when preserving the ability of the cells 232, 234 to produce electricity is desired.

Figure 11:
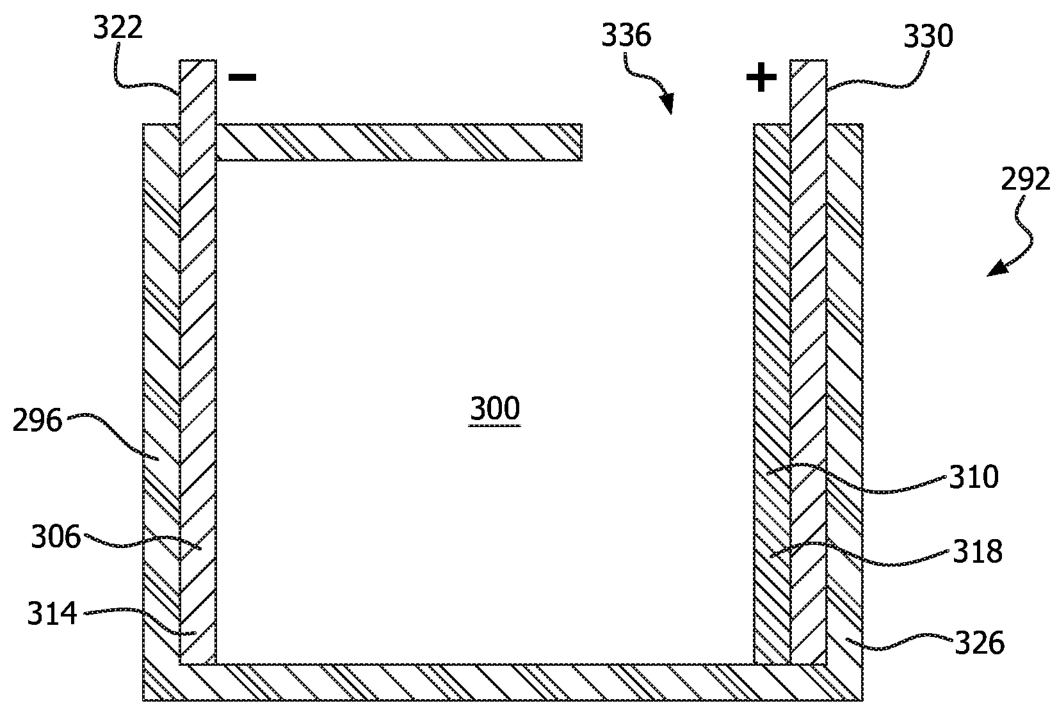
FIG. 11 is a diagrammatic view of yet another metal-air electrochemical cell, utilizing an electrolyte that is exposed to air, and without a separator.
Figure 12:
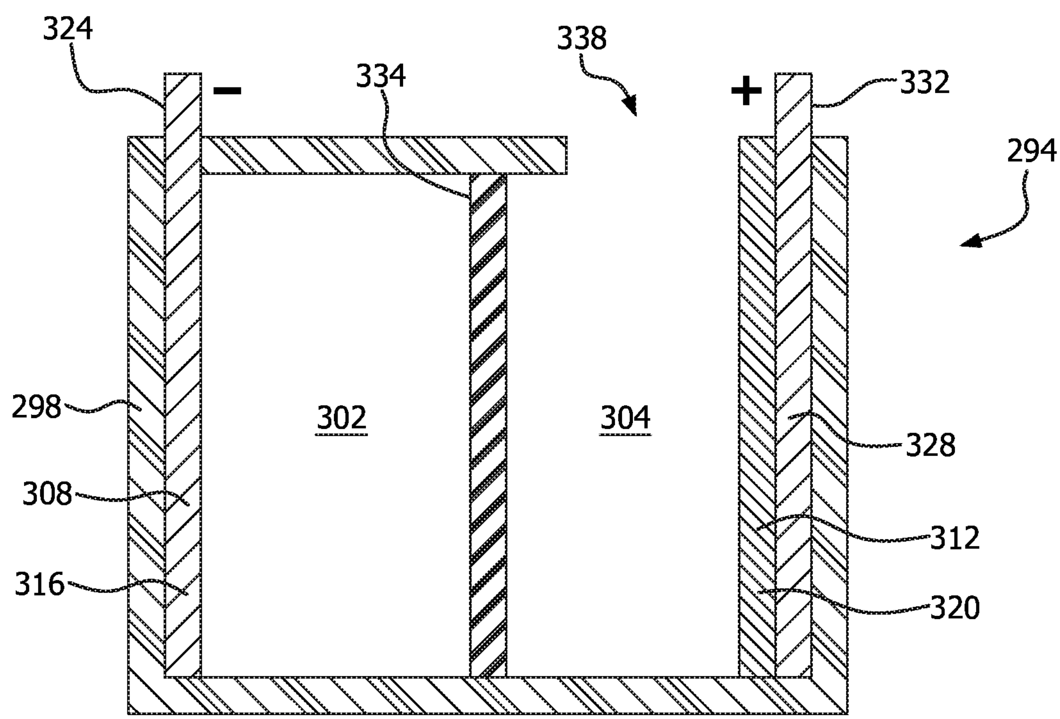
FIG. 12 is a diagrammatic view of yet another metal-air electrochemical cell, utilizing a catholyte that is exposed to air, and without a separator.

Referring to FIGS. 11 and 12, another two variations of metal air cells 292, 294 are illustrated. The cells 292, 294 include housings 296, 298 containing an electrolyte 300, 302, 304 therein (with the electrolyte 302 being an anolyte and electrolyte 304 being a catholyte). An anode 306, 308 and cathode 310, 312 are secured within the housing 296, 298 so that an internal portion 314, 316, 318, 320 of the anode 306, 308 and cathode 310, 312, respectively, are in contact with the electrolyte 300, 302, or 304. An external portion 322, 324 of the anode 306, 308 provides a means of connecting a load to the cell 292, 294, or a power supply in the event that a rechargeable cell 292, 294 is constructed. The illustrated example of the anode 306, 308 is made from either iron or manganese, although other materials, for example, steel, aluminum, and aluminum alloys could also be used. The illustrated example of the cathode 310, 312 is made from $Fe_2O_3$, $MnO_2$, or bauxite (approximately 60% $Fe_2O_3$) residue, supported by a current collector 266, 268. The current collector 326, 328 includes an external portion 330, 332 for connecting a load to the cell 292, 294, or to a power supply in the event that a rechargeable cell 292, 294 is constructed. The illustrated example of the current collector 326, 328 is made from graphite, although other examples could be made from amorphous carbon, carbon felt, or other forms of carbon.

The cell 292 differs from the cell 294 by including a separator 334, separating the anolyte 302 from the catholyte 304. The separator 334 can be made from a variety of materials, including paper; polypropylene; standard ion exchange membranes such as sulfonated tetrafluoroethylene based fluoropolymer-copolyme, a suitable example of which is sold under the trademark NAFION by DuPont; an ion exchange membrane; or a separator made from a more porous material that allows some passage of electrolyte 302, 304 therethrough.

Each of the housings 296, 298 defines an opening 336, 338 therein, permitting air to come into contact with the electrolyte 300 and catholyte 304. Exposing the electrolyte 300 and catholyte 304 to air results in oxidation of the iron ions from $Fe^{2+}$ to $Fe^{3+}$.

Figure 13:
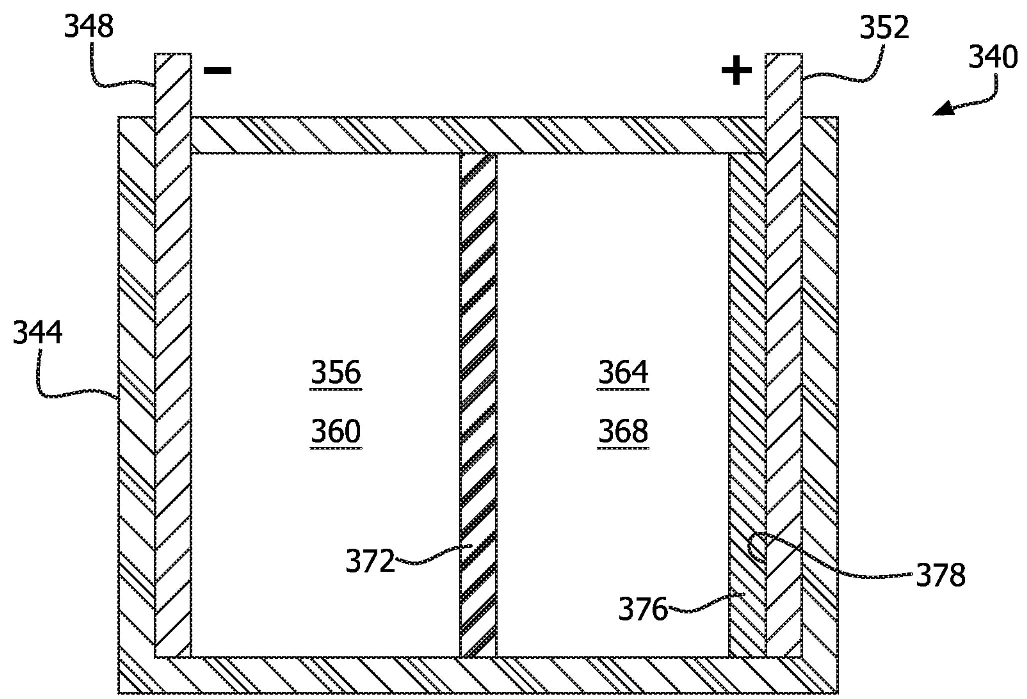
FIG. 13 is a diagrammatic view of an electrochemical cell utilizing gall ink as an anode coating.
Figure 14:
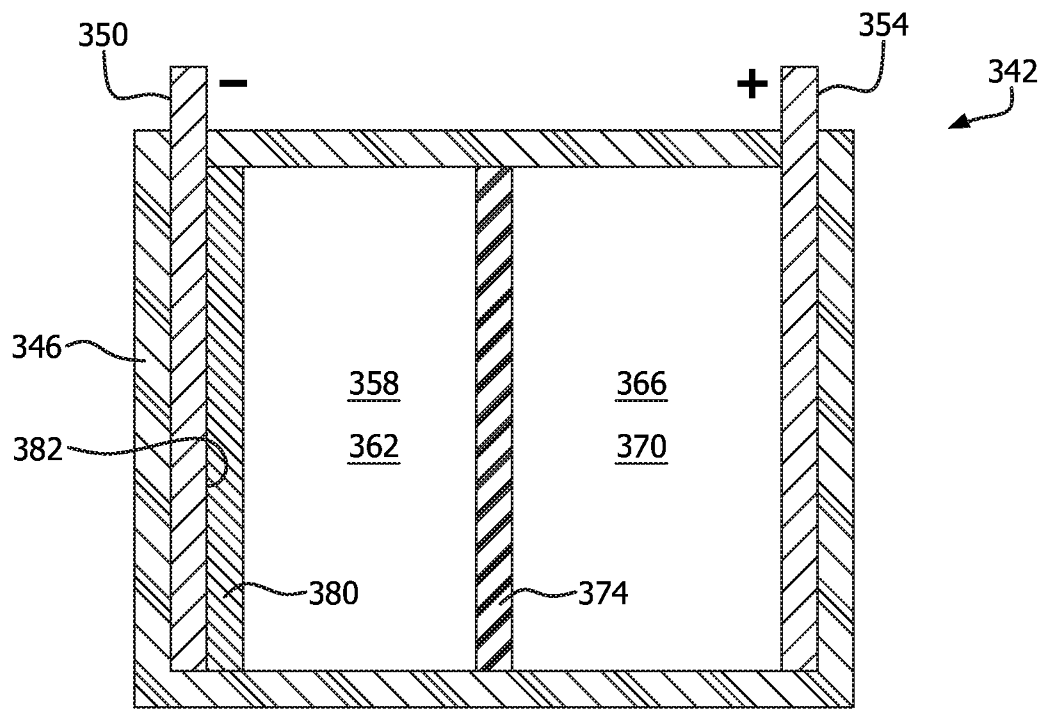
FIG. 14 is a diagrammatic view of an electrochemical cell utilizing gall ink as a cathode coating.

FIGS. 13 and 14 illustrate another possible use of gall ink within an electrochemical cell. The electrochemical cells 340, 342 each include a housing 344, 346 having an anode 348, 350 and cathode 352, 354 disposed therein. Each cell 340, 342 is divided into an anode portion 356, 358 containing an anolyte 360, 362, and a cathode portion 364, 366 containing a catholyte 368, 370, by a separator 372, 374. The anodes 348, 350, cathodes 352, 354, and separator 372, 374 can be made from any materials described within any of the above examples. In the example cell 340 of FIG. 13, a gall ink 376, which may be any variety of gall ink described above, has been applied to the surface 378 of the cathode 352 so that the gall ink 376 is in contact with the catholyte 368. In the example cell 342 of FIG. 14, a gall ink 380, which may be any variety of gall ink described above, has been applied to the surface 382 of the anode 350 so that the gall ink 380 is in contact with the anolyte 362. In other examples, both the anode and cathode may include gall ink applied thereto. The anolyte 360, 362 and catholyte 368, 370 may be any variety of gall ink described above, or may be any other presently known electrolyte. In some examples, the anolyte 360, 362 and catholyte 368, 370 may include lithium ions therein.

If lithium ions are included within the anolyte 360, 362 and catholyte 368, 370, then the cells 340, 342 can be charged and discharged in the same manner as presently available lithium ion cells. When a voltage is applied to the anode and cathode to charge the cells 340, 342, lithium ions will move through the separator 372, 374 towards the anode 348, 350. When a load is connected to the cells 340, 342, lithium ions will move through the separator 372, 374 towards the cathode 352, 354.

Figure 15:
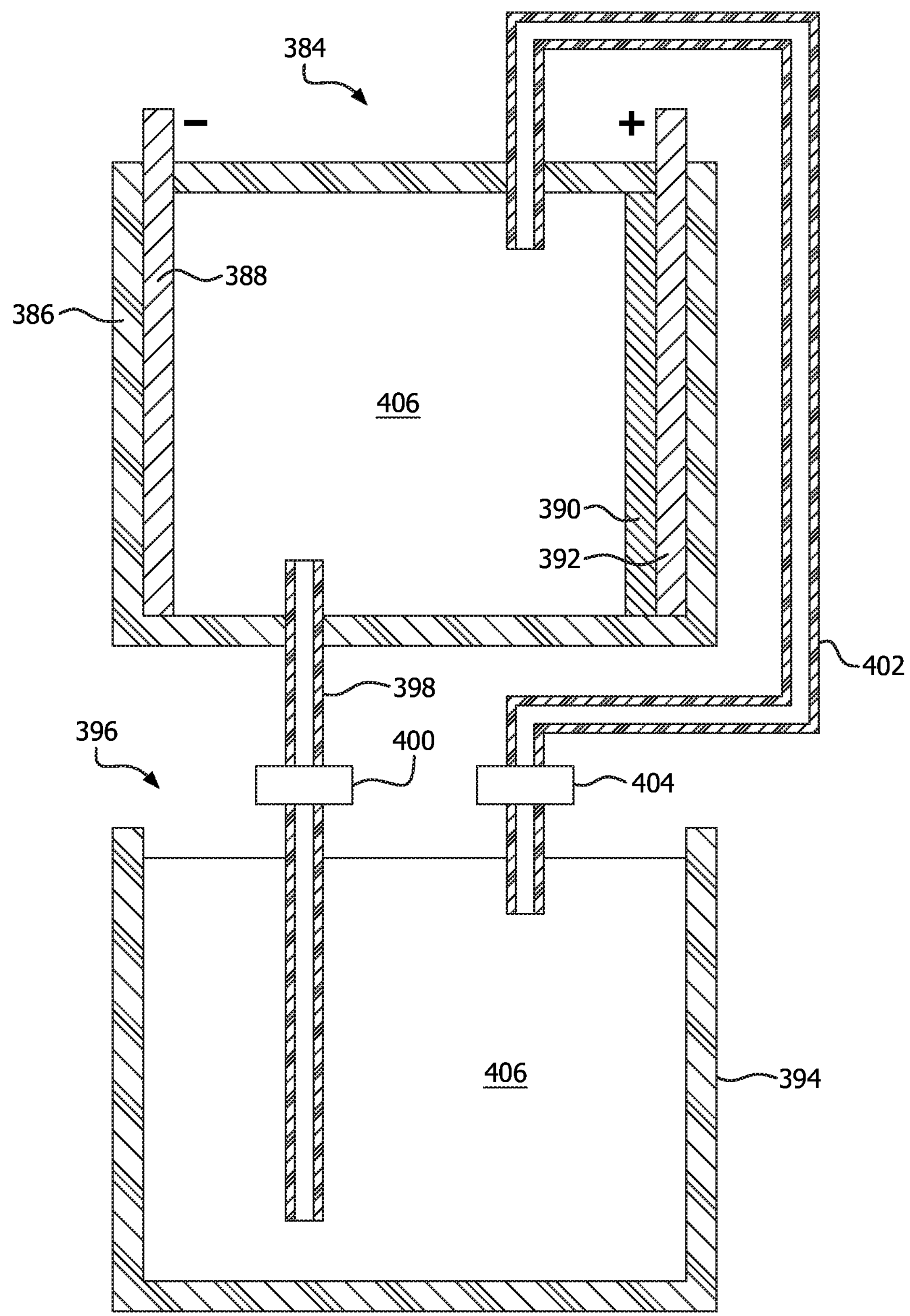
FIG. 15 is a diagrammatic view of a metal air electrochemical cell.

Another example of a metal-air cell 384 is illustrated in FIG. 15. The cell 384 includes a housing 386 having an anode 388 and cathode 390 therein. Any anode or cathode described in any of the above examples may be used within the cell 384. The illustrated example of a cathode 390 is supported on a current collector 392. The illustrated example of the housing 386 is closed, but is connected to an oxidation tank 394 that is structured to expose electrolyte 406 therein to air. The illustrated example of an oxidation tank 394 has an open top 396, but another air source, such as those illustrated in FIGS. 9-10, may alternatively be used. The oxidation tank 394 is connected to the housing 386 by a first conduit 398 having optional pump 400, and a second conduit 402 having an optional pump 404. The housing 386 and tank 394 both contain a gall ink electrolyte 406.

Electrolyte 406 within the tank 394 is exposed to air, oxidizing the $Fe^{2+}$ ions to $Fe^{3+}$ ions. The electrolyte is transferred through the first conduit 398 to the housing 386, where it reacts with the anode 388 and cathode 390 as described above. The electrolyte 406 is then transferred through the second conduit 402 back to the tank 394, where it is again oxidized for re-use. The rate of flow of electrolyte 406 can be controlled by varying the speed and/or power of the pu,ps 400, 404, or by varying the size of the conduits 398, 402. Depending on the specific arrangement of the housing 386 and tank 394, one or both of the conduits 398, 402 may operate by gravity feed, perhaps by transferring electrolyte 406 from the top of one of the housing 386 and tank 394 to the bottom of the other of the housing 386 and tank 394. Although the electrolyte 406 can be re-used repeatedly, it will gradually include more and more $Fe^{0}$ ions from the anode 388. Thus, long-term use of the cell 384 will require occasional replacement of the anode 388.

The present invention therefore provides an electrochemical cell that can be made from materials that can be easily obtained in off-grid locations. The call can be made to be rechargeable, or can be a single use cell in which replacing materials is required for re-use, depending on the availability of recharging equipment and energy.

A variety of modifications to the above-described embodiments will be apparent to those skilled in the art from this disclosure. Thus, the invention may be embodied in other specific forms without departing from the spirit or essential attributes thereof. In particular, various components of the examples described herein can be mixed and matched to produce other examples of electrochemical cells. Furthermore, although the cells depicted herein are illustrated as they would likely appear if they are assembled in an off-grid location, they are not limited to this configuration, and can be made in any standard or nonstandard cell or battery size or configuration, including but not limited to presently available battery sizes and shapes. Although individual cells are illustrated, those skilled in the art will recognize that cells can be combined into multiple cell assemblies by connecting the cells in series and/or in parallel. The particular embodiments disclosed are meant to be illustrative only and not limiting as to the scope of the invention. The appended claims, rather than to the foregoing specification, should be referenced to indicate the scope of the invention.

What is claimed is:

1. An electrochemical cell, comprising:

a housing;

an anode disposed at least partially within the housing;

a cathode disposed at least partially within the housing; and at least one electrolyte contained within the housing, the at least one electrolyte comprising gall ink, the anode and cathode being in contact with at least one electrolyte.

2. The electrochemical cell according to claim 1, wherein the anode is made from iron, manganese, steel, aluminum, an aluminum alloy, or a combination thereof.

3. The electrochemical cell according to claim 1, wherein the cathode is made from $Fe_2O_3$, $MnO_2$, bauxite, graphite, carbon, or combinations thereof.

4. The electrochemical cell according to claim 3, wherein the cathode is supported by a current collector.

5. The electrochemical cell according to claim 4, wherein the current collector is made from graphite, amorphous carbon, carbon felt, carbon, or combinations thereof.

6. The electrochemical cell according to claim 1, further comprising mold growing on the gall ink.

7. The electrochemical cell according to claim 1, further comprising:

a first electrolyte storage tank, the first electrolyte storage tank being connected by a fluid conduit to the housing, whereby electrolyte may flow from within the first electrolyte storage tank to within the housing; and a second electrolyte storage tank, the second electrolyte storage tank being connected by a fluid conduit to the housing, whereby electrolyte may flow from within the housing to within the second electrolyte storage tank.

8. The electrochemical cell according to claim 1, further comprising a separator disposed within the housing between the anode and the cathode, the separator being structured to divide the housing into an anolyte portion and a catholyte portion, the separator being further structured to substantially maintain separation between a first electrolyte or anolyte in contact with the anode, and a second electrolyte or catholyte in contact with the cathode.

9. The electrochemical cell according to claim 8, further comprising:

a first anolyte storage tank, the first anolyte storage tank being connected by a fluid conduit to the anolyte portion of the housing, whereby electrolyte may flow from within the first electrolyte storage tank to within the anolyte portion of the housing;

a first catholyte storage tank, the first catholyte storage tank being connected by a fluid conduit to the catholyte portion of the housing, whereby electrolyte may flow from within the first catholyte storage tank to within the catholyte portion of the housing;

a second anolyte storage tank, the second anolyte storage tank being connected by a fluid conduit to the anolyte portion of the housing, whereby electrolyte may flow from within the anolyte portion of the housing to within the second electrolyte storage tank; and a second catholyte storage tank, the second catholyte storage tank being connected by a fluid conduit to the catholyte portion of the housing, whereby electrolyte may flow from within the catholyte portion of the housing to within the second electrolyte storage tank.

10. The electrochemical cell according to claim 1, further comprising an air source connected to the housing, whereby air may be directed from the compressed air source to within the housing.

11. The electrochemical cell according to claim 1, further comprising:

an electrolyte oxidation tank, the electrolyte oxidation tank being structured to expose electrolyte therein to air;

a first fluid conduit structured to transport electrolyte from within the electrolyte oxidation tank to within the housing; and a second fluid conduit structured to transport electrolyte from within the housing to within the electrolyte storage tank.

12. The electrochemical cell according to claim 1, wherein at least one of the anode and the cathode includes a layer of gall ink applied thereto.

13. An electrochemical cell, comprising:

a housing;

an anode disposed at least partially within the housing;
a cathode disposed at least partially within the housing;
at least one electrolyte contained within the housing, the electrolyte contacting the anode and the cathode; and
at least one of the anode and cathode including a layer of gall ink.

14. A method of making an electrochemical cell, comprising:
providing a housing:
providing an anode at least partially disposed within the housing;
providing a cathode at least partially disposed within the housing; and
providing at least one electrolyte within the housing, the at least one electrolyte comprising gall ink.

15. The method according to claim 14:
wherein the gall ink contains $metal^{2+}$ ions; and
further comprising converting at least some $metal^{2+}$ ions within the gall ink to $metal^{3+}$ ions.

16. The method according to claim 15, wherein converting at least some $metal^{2+}$ ions within the gall ink to $metal^{3+}$ ions includes applying a voltage to the anode and cathode.

17. The method according to claim 16, wherein the voltage is applied using a standard charger for nickel metal hydride batteries.

18. The method according to claim 15, wherein converting at least some $metal^{2+}$ ions within the gall ink to $metal^{3+}$ ions includes oxidizing the gall ink.

19. The method according to claim 14, further comprising permitting mold to grow in the gall ink.

20. The method according to claim 14:
wherein the gall ink includes water; and
further comprising permitting the water to evaporate.

21. A method of generating electricity from an electrochemical cell, comprising:
providing a housing:
providing an anode at least partially disposed within the housing;
providing a cathode at least partially disposed within the housing;
providing at least one electrolyte within the housing, the at least one electrolyte comprising gall ink having $metal^{3+}$ ions therein; and
connecting the anode and cathode to a load.

22. The method according to claim 21, further comprising providing a supply of air to the electrolyte.

23. The method according to claim 21, further comprising:
supplying electrolyte containing at least some $metal^{3+}$ ions to the housing; and
draining electrolyte containing at least some $metal^{2+}$ ions from the housing.

* * * * *